March 6, 1962   R. FENGLER   3,023,813
PROPELLER
Filed Jan. 2, 1959   4 Sheets-Sheet 1

380 M.P.H.   390 M.P.H.

600 M.P.H.   1200 M.P.H.

760 M.P.H.   780 M.P.H.

INVENTOR
RUDOLF FENGLER
BY
ATTORNEY.

March 6, 1962  R. FENGLER  3,023,813
PROPELLER

Filed Jan. 2, 1959  4 Sheets-Sheet 2

INVENTOR
RUDOLF FENGLER
BY
*Ernest Montagne*
ATTORNEY.

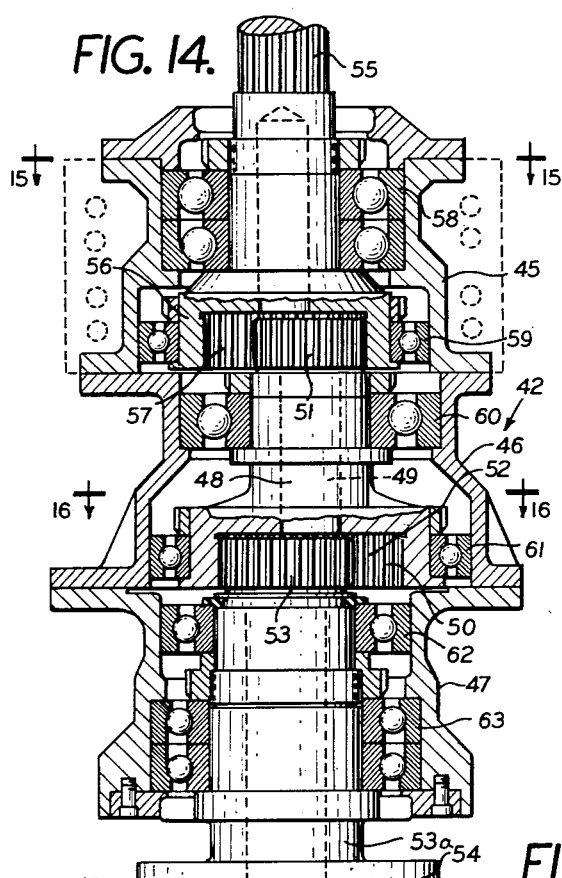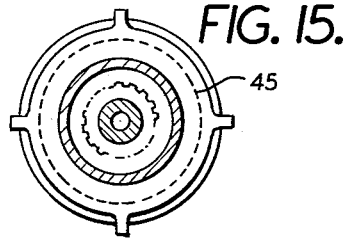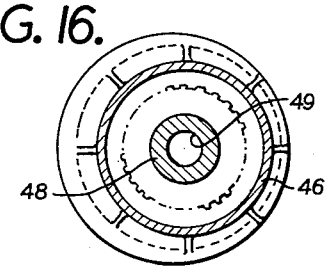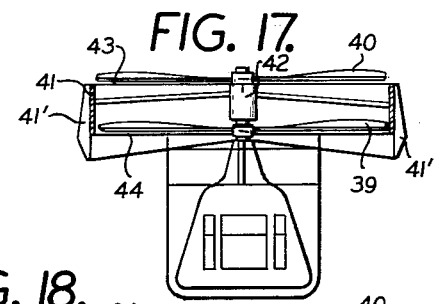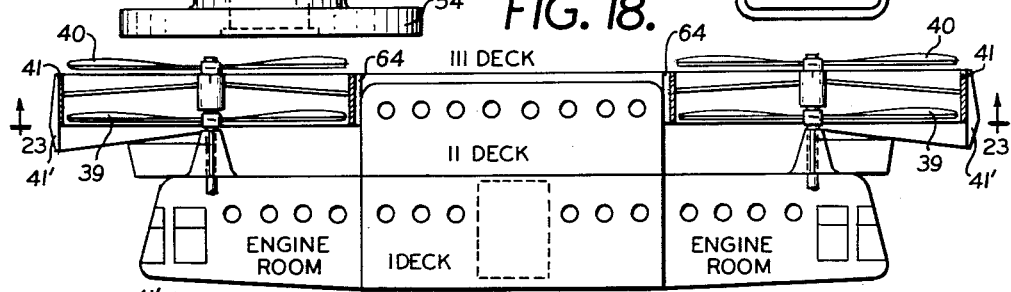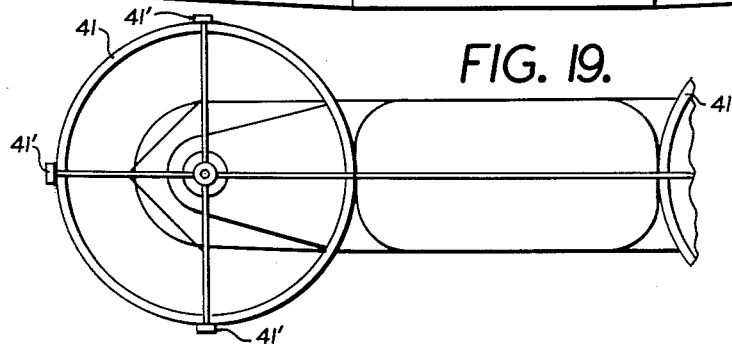

March 6, 1962 R. FENGLER 3,023,813
PROPELLER
Filed Jan. 2, 1959 4 Sheets-Sheet 4

INVENTOR
RUDOLF FENGLER
BY
ATTORNEY.

United States Patent Office 3,023,813
Patented Mar. 6, 1962

3,023,813
PROPELLER
Rudolf Fengler, 532 W. 111th St., New York 25, N.Y.
Filed Jan. 2, 1959, Ser. No. 784,764
2 Claims. (Cl. 170—135.25)

The present invention relates to a propeller in general and units of increased efficiency in particular, which comprise two or more propellers rotating at different speed ranges, the axis of each of the propellers being disposed coaxially relative to each other.

The present invention is based on discovery that a tandem arrangement of a plurality of propellers which turn at different speeds bring about an increased efficiency, particularly if under certain circumstances the medium driven by the propeller is fed through a guide channel. By such arrangement an appreciable increase in the speed of the air or water masses is brought about without increasing the outer diameter of the screws, propellers, rotors or the like.

It is thus one object of the present invention to provide a propeller unit which comprises at least two propellers which rotate at different speeds in such a manner that taken in the direction of movement the propeller of the entire unit operating the first stage has the lower or normal speed, and the propeller of the entire unit operating the second stage is subjected to the higher speed. Among other fields of application, merely by example, it may be stated that the unit in accordance with the present invention may be used for airplanes, for ship screws, for helicopters or the like.

It is another object of the present invention to provide a unit comprising a plurality of propellers, wherein each pair of adjacent propellers has a difference in the speed of rotation which is about double the speed of the adjacent propeller.

It is to be understood that the principle of the present invention may be applied to any number of propellers which are disposed coaxially relative to each other, yet for the purpose of simplicity, by example, a unit having two propellers in coaxial arrangement is disclosed below.

With these and other objects in view which will become apparent in the following detailed description, the present invention will be clearly understood in connection with the accompanying drawings, in which:

FIG. 14 is an axial section through a reduction gear for a rotor designed for operation in two stages;

FIG. 15 is a section along the lines 15—15 of FIG. 14;

FIG. 16 is a section along the lines 16—16 of FIG. 14;

FIG. 17 is a front elevation of a helicopter arrangement showing the rotors designed for operation in two stages in tandem arrangement in combination with a guide channel, the latter shown in section;

FIG. 18 is a side elevation of a helicopter arrangement containing two units shown in FIG. 17;

FIG. 19 is a top plan view of the arrangement shown in FIG. 18;

Figure 1:
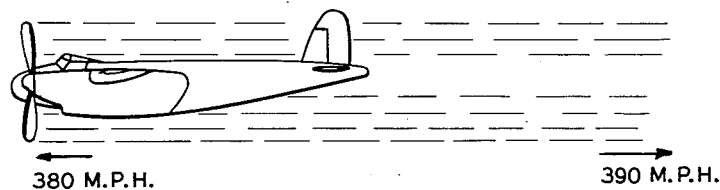
FIGURE 1 is a side elevation of a conventional propeller-driven airplane.

Referring now to the drawings, and in particular to FIGS. 1 to 7, a two-stage propeller unit with a two-shaft system designed particularly for airplanes is disclosed.

Figure 2:
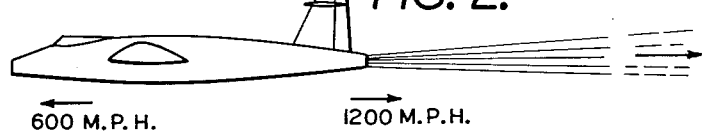
FIG. 2 is a side elevation of a conventional jet plane.

As clearly disclosed in FIG. 1, a conventional propeller is provided to bring about the thrust force for the airplane by creating and accelerating an air jet in rearward direction. By providing a single propeller of comparatively large diameter, a large amount of air is pushed rearwardly with a comparatively slow speed. It has been found if the speed of the airplane in forward direction is about 380 m.p.h., an air stream in rearward direction is experienced which has a speed of about 390 m.p.h. As shown in FIG. 2, the same principle is applied to a jet plane, where the forward speed may be for instance 600 m.p.h. while the rearwardly directed jet speed is about 1200 m.p.h.

Figure 3:
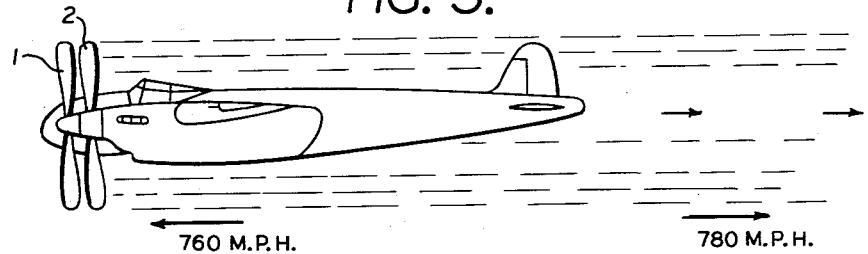
FIG. 3 is a side elevation of an airplane which is equipped with a propeller unit designed to operate in two stages in accordance with the present invention.

As clearly seen in FIG. 3 of the drawings, the principle of the present invention is applied to an airplane wherein two propellers 1 and 2 are disposed one behind the other in coaxial arrangement. By such arrangement, an aerodynamic effect is brought about due to the fact that the second propeller 2 effects a further direct acceleration of the air stream emerging from the first propeller 1. Due to the fact that the propeller operating the second stage has a number of revolutions which is up to the double amount of the number of revolutions operating the first stage, an acceleration of the air stream speed is achieved between the propellers to an extent that the air stream emerging from the second stage propeller has a speed up to the double of the air stream emerging from the first stage propeller. By such arrangement the thrust and the flying speed reach highest values.

Due to the fact that the propellers 1 and 2 rotate with different speeds, it is required that the shafts carrying the propellers likewise rotate with different speeds and for this reason a hollow shaft is arranged coaxially with a full shaft.

Figure 4:
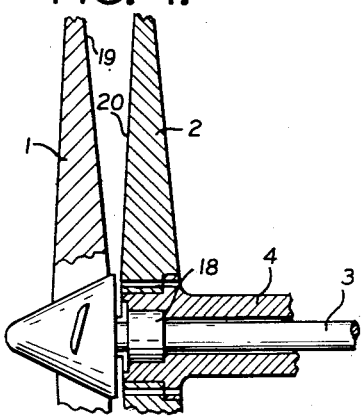
FIG. 4 is a fragmentary showing of two adjacent propellers disposed coaxially relative to each other, partly in section.
Figure 5:
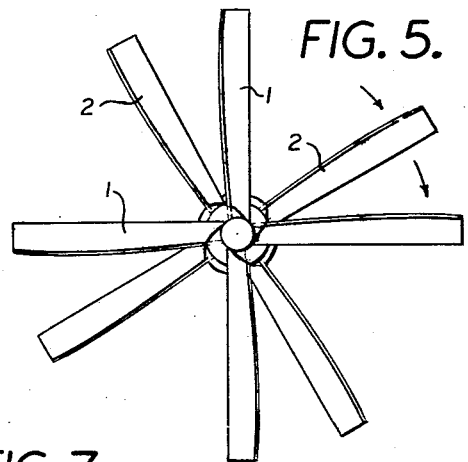
FIG. 5 is a front elevation of the two propeller unit shown in FIG. 4.

Referring now to FIGS. 4 and 5 of the drawings, it will be apparent that the centrally disposed shaft 3 is received by the hollow shaft 4 surrounding the central shaft 3. In the embodiment disclosed in FIGS. 4 and 5, the central shaft rotates with a slower speed than the shaft 4, in order to transfer to the propeller 2 a higher speed than that of the propeller 1. The different speeds of the propellers 1 and 2 and of the shafts 3 and 4, respectively, may be brought about by any conventional transmissions shown in FIGS. 6 and 7, respectively.

Figure 6:
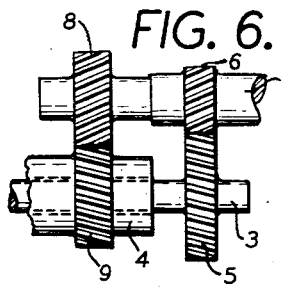
FIGS. 6 and 7 are plan views of two different drives for the respective propellers of the unit.

As may be ascertained from FIG. 6, the shaft 3 which drives directly the propeller 1, has mounted thereon preferably a helical gear 5 which meshes with the helical gear 6, the latter being keyed to the main drive shaft 7 which carries an additional helical gear 8. The latter meshes with the helical gear 9 which is keyed to the hollow shaft 4, thereby transmitting a higher rotating speed for the hollow shaft 4.

Figure 7:
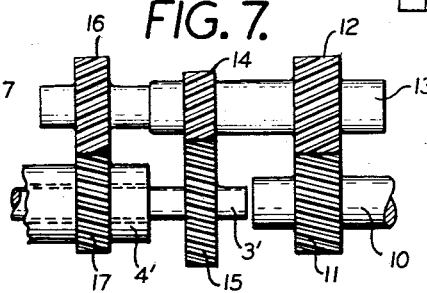

A similar transmission unit is disclosed in FIG. 7 where a main drive shaft 10 is provided having keyed thereto preferably a helical gear 11 which meshes with a helical gear 12 keyed to an auxiliary shaft 13. The shaft 13 carries a second helical gear 14 which meshes with a helical gear 15 keyed on the shaft 3' and the auxiliary shaft 13 carries still a further helical gear 16 which meshes with a helical gear 17 mounted on the hollow shaft 4. In this manner, the gear 11 disposed on the main drive shaft 10 transmits simultaneously the rotation of the central shaft 3' and also of the hollow shaft 4'. It is to be understood that by changing the gears, any desired relation of the speed of the central shaft 3 and that of the hollow shaft 4 may be obtained.

The central shaft 3 has a properly dimensioned and preferably overdimensioned bearing of any conventional structure 18, preferably with pressurized oil, and is disposed in the hollow shaft 4. The axial distance between the propellers 1 and 2 is preferably as small as possible and it is desirable to provide a median axial distance between the emerging edge 19 of the propeller 1 (FIG. 4) and the forward edge 20 of the propeller 2 not to go beyond the length of the hub of the propellers. If, however, the distance between the propellers 1 and 2 should be larger, it is required that a guide ring is provided, surrounding the propellers, as will be described later on in connection with helicopter units. In other words, the propeller units described now in connection with airplanes may be used in horizontal arrangement for airplanes or in a vertical arrangement for helicopters, or such unit may assume any inclined position between the horizontal and the vertical.

The two propellers disclosed in FIG. 5 have the same sharp edges and sharp profile and also have the same outer diameter.

Particular care is required for the securing and mounting of the second propeller 2 on the hollow shaft 4. Not only coupling flanges with securing bolts, but also a groove engagement between the outer surface of the hollow shaft 4 and the inner face of the propeller 2, as well as pressure oil feeding and a precision bearing are essential.

The power required for the propellers arranged in stages, is for instance as follows:

|  | Rev./min. | PS | M.p.h. |
|---|---|---|---|
| First stage, n | About 1,440 | 4,500 | 380 |
| Second stage, 2n | About 2,880 | 13,500 | 760 |
|  |  | [1] 18,000 |  |
|  |  | [2] 72,000 |  |

|  | Rev./min. | PS | M.p.h. |
|---|---|---|---|
| First stage, n | About 1,440 | 4,500 | 380 |
| Second stage, 1.44n | About 2,075 | 4,860 | 550 |
|  |  | [1] 9,360 |  |
|  |  | [2] 37,440 |  |

[1] Per drive shaft
[2] Per four drive shafts.

The economical superiority of the propeller drive in stages, particularly at the "quiet speed" of about 550 m.p.h. is retained.

While the embodiment described in connection with FIGS. 1 to 7 pertains particularly to airplanes, reference is now made to FIGS. 8 to 13 disclosing an application of a multiple propeller unit designed for a ship drive.

Figure 8:
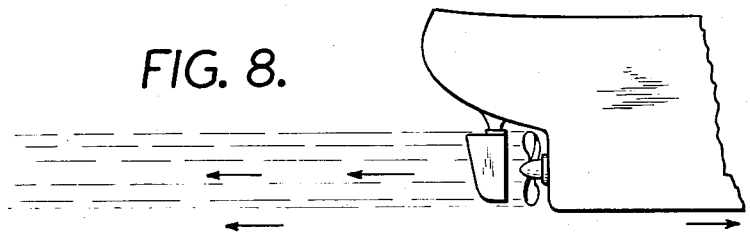
FIG. 8 is a rear elevation of the end portion of a ship or boat showing a conventional screw or propeller.

As is well known and shown in FIG. 8, the drive for a ship by a single propeller creates a thrust pushing forwardly the boat or ship, which propeller accelerates a quantity of water in rearward direction.

Figure 9:
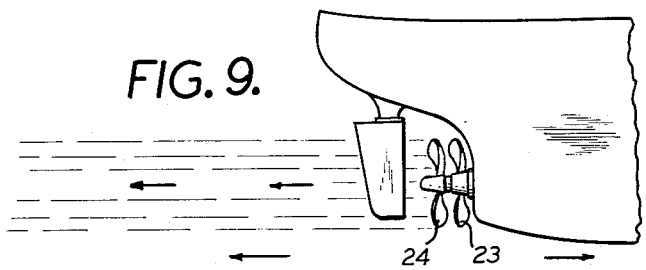
FIG. 9 is a rear end portion of a ship or boat showing the propeller arrangement designed to operate in two stages in accordance with the present invention.
Figure 10:
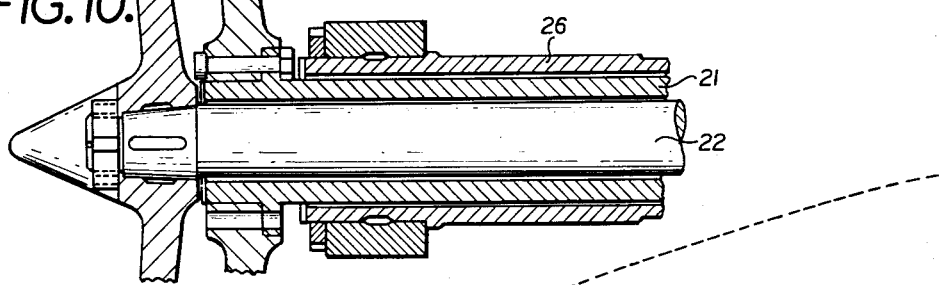
FIG. 10 is a partly axial section of a propeller arrangement designed to operate in two stages to be used for ships.

If, however, as disclosed in FIG. 9 of the drawings, two propellers are provided in coaxial arrangement to provide two drive stages, in which case the propeller 23 of the first stage having normal rotating speed provides a normal acceleration of the water which accelerated water quantity is, however, further accelerated in the propeller 24 of the second stage until up to the double speed of water emerging from the propeller 24 may be brought about. Since a comparatively higher power is required for acceleration of the speed of a ship in water, the propeller of the second stage will preferably have 1.5n revolutions for the second stage.

Applying the same principle as it has been disclosed above in connection with two propeller units for airplanes, the two-propeller drive for driving of ships requires also two drive shafts, namely, the hollow shaft 21 which turns here with the lesser speed than the centrally disposed shaft 22, which assumes here the greater speed. The propeller 23 is mounted for rotation with the hollow shaft 21, while the propeller 24 is secured to the central shaft 22. A transmission unit 25 is provided in order to bring about the proper speed for both shafts from a common drive.

Thus, the first propeller 23 rotates with the normal number of revolutions on the hollow shaft 21, which in turn turns in the stern tube 26. The hollow shaft 21 as well as the stern tube 26 have inner conventional lining. The second propeller 24, taken in the direction of movement of the ship, reveives up to the double number of revolutions 2n compared with the number of revolutions of the first propeller 23 and runs with its shaft 22 in the hollow shaft 21, forming a bushing thereto. The second propeller 24 is secured to the shaft 22 in the conventional manner on its conical end by means of a wedge and nut.

The transmission 25 comprises a primary thrust bearing 27 for the main drive shaft 28, a conventional suitable coupling member 29 for the shaft 22, a secondary thrust bearing 30 for the shaft 21, as well as a coupling 31 for the shaft 21. The main drive shaft 28 carries a gear 32 which meshes with a gear 33 mounted on an auxiliary shaft 34 which carries a second gear 35 meshing a gear 36 keyed to the hollow shaft 21, thereby transmitting the drive from the main drive shaft 28 to the shaft 22, as well as to the hollow shaft 21.

Figure 11:
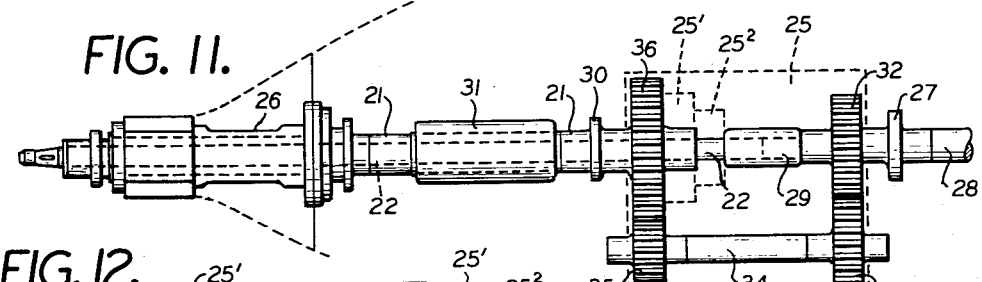
FIG. 11 is a plan view of the transmission drive for the respective propellers provided in FIG. 10.
Figure 12:
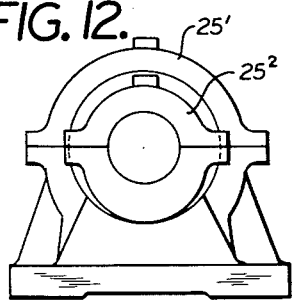
FIGS. 12 and 13 are an end view and a front elevation, respectively, for the double bearing arrangement at a predetermined point for the respective shafts carrying said propellers.
Figure 13:
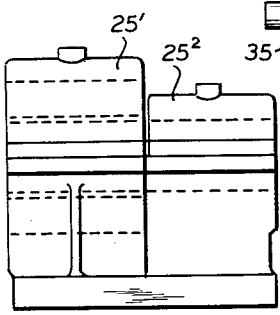

Both shafts 21 and 22 are mounted or supported at a predetermined point indicated in FIG. 11 in a double bearing 25', 25² having a common base as disclosed in FIGS. 12 and 13. The arrangement of the coupling 29 permits of removal of the shaft in rearward direction in case of repairs or replacements. The shafts 21 and 22 rotate preferably with pressure cooling.

The axial play between the hubs of the two propellers 23 and 24 is as close as possible. The median axial distance between the emerging edge 37 of the propeller 23 and the incoming edge 38 of the propeller 24 does not amount to more than one length of the hub of the propellers. It is to be understood that the outer diameter of both propellers 23 and 24 is the same.

The multi-propeller arrangement creates great thrust forces with very favorable efficiency of the propellers.

Output on the shafts for propellers arranged in stages is, for instance, as follows:

|  | PS | Rev./min. | Ship speed sea-miles p.h. |
|---|---|---|---|
| First stage, n | 1,500 | 114 | 12 |
| Second stage, 2n | 10,500 | 228 | 24 |
| Total output | 12,000 |  |  |

|  | PS | Rev./min. | Ship speed sea-miles p.h. |
|---|---|---|---|
| First stage, n | 2,400 | 96 | 18 |
| Second stage, 1.5n | 5,760 | 144 | 27 |
| Total output | 8,160 |  |  |

Referring now to FIGS. 14 to 19 of the drawings, an arrangement is disclosed for the drive of the rotors arranged in stages in connection with a coaxial reduction drive and a guide channel, particularly designed for helicopters.

The conventional rotor of a helicopter produces the thrust force in such a manner that an air stream is accelerated downwardly. By arranging of a rotor having a large diameter, a comparatively great air mass is pushed downwardly with a comparatively slow speed. In accordance with the present invention, the aerodynamic effect is still further increased by arranging of a second rotor 39, which brings about a further acceleration of the speed emerging from the first rotor 40, this acceleration being advanced up to the double speed compared with the speed obtained from the first rotor. In this manner, the vertical rising speed and the possible carrying load reach highest values. The two rotors 39 and 40 are disposed coaxially and may be used without a guide channel if the rotors 39 and 40 are disposed very close to each other, while on the other hand, if there is an appreciable distance between the rotor 39 and the rotor 40, a guide channel 41 is required. In the embodiment disclosed in FIG. 17, a reduction gear unit 42 is arranged between the rotors 39 and 40.

The first rotor 40 turns in the free space above the entrance edge 43 of the guide channel 41, the axis of said guide channel being disposed vertically in case of helicopters, but may be disposed horizontally in its application for airplanes, or even may assume any inclined position between the horizontal and the vertical direction.

The second rotor 39 turns within the guide channel 41 immediately above the emerging edge 44 with slight play between the guide channel 41 and the outer ends of the rotor 39. It is to be understood that the outer diameter of the rotors 39 and 40 disposed in two stages is the same.

Referring now to FIGS. 14 to 16, an axial section of the reduction gear is disclosed. The housing for the transmission comprises three portions 45, 46 and 47. The overdimensioned shaft 48, which has an axial bore 49, which shaft 48 is disposed in the central housing portion 46 and has inner teeth 50, the upper gear 51 carried by the shaft 48 and the lower gear 52 being likewise carried by the shaft 48. The shaft 48 has at the point of the latter gear an outer face 52. The shaft 53a is disposed in the lower housing portion 47 and is likewise overdimensioned and has an axial bore 49a again for the purpose of weight reduction. The shaft 53a is formed integrally with the gear 53 and with the coupling flange 54. The comparatively small axial thrust of the shaft 53a is taken up by the main gear shaft 48 which is supported by proper bearings 60 capable of assuming axial thrust.

The shaft 55 is disposed in the upper housing portion 45 and carries at its lower end the gear 57 having inner teeth. The longitudinal axis of the shaft 55 coincides with the longitudinal axis of the shaft 53a, while the longitudinal axis of the shaft 48 disposed between the shafts 53a and 55 is set-off radially at a predetermined distance. The gears 51 and 57 are in mesh, as well as the gears 50 and 53. Proper ball bearings 58, 59, 60, 61, 62 and 63 are provided for mounting said shafts for rotary movement. The bearing 58 is preferably designed for taking heavy axial and radial forces. It is, however, understood that any suitable bearing may be provided. The radial bearing 59 adapted to take up radial forces is arranged on the outer face 52 of the gear 57 and likewise the bearing 61 is disposed upon the outer face 52 of the gear 50. The double bearing 63 is designed for heavy axial and radial loads. The length of the guide channel 41 is determined by the length of the drive together with the length of the hub of the lower rotor 39. The upper housing portion 45 is preferably equipped with four strong ribs which are adapted to take up the thrust of the first stage and in order to secure the drive on the post 64.

Referring now to FIGS. 17 to 19, the assembly of the drives, the rotor units and of the vertical guide channel, is shown in connection with a helicopter having three decks.

The helicopter disclosed by example in FIGS. 18 and 19 has two rotor units, each of the units having two rotors arranged in two stages. The engines for driving the respective shafts is disposed on the first deck which provides sufficient space to arrange an additional horizontal drive for the helicopter (not shown).

Helicopters which are equipped with rotors having two stages require drives having a great output, for instance:

|  | PS |  | PS |
|---|---|---|---|
| n stage | 2,700 | n stage | 2,400 |
| 1.5 n stage | 2,900 | 2n stage | 7,200 |
| 2 rotors | 5,600 | 2 rotors | 9,600 |
| 4 rotors | 11,200 | 4 rotors | 19,200 |

This arrangement is suitable for a heavy pay-load up to ten tons or even more. Furthermore, the arrangement of a rotor unit with two stages wherein the second stage has a number of revolutions of $1.5n$ up to $2n$, if $n$ is the number of revolutions of the first stage, permits of reduction of the diameter of the rotors and simultaneously an increase in the thrust power.

Referring now to FIGS. 20 to 23, the reduction gear unit is substantially identical with that shown in FIG. 14, with the exception that beveled gears 51', 57', and 53' and 50' are provided. The other elements of the structure are identical with that shown in FIG. 14 and reference is made to the remainder of the structure to the above stated description of FIG. 14.

Several structures have been disclosed and the following four possibilities exist, which may be applied in different fields.

The first arrangement may comprise two propellers or rotors disposed closely adjacent each other, whereby one of the propellers is driven by a hollow shaft, which arrangement does not require a guide channel.

The second possibility exists by arranging the propellers slightly spaced apart from each other, in which case the second propeller is driven by a hollow shaft and a guide channel surrounds the propellers.

The third possible structure resides in an arrangement wherein the propellers are disposed at a predetermined distance apart from each other, in which case a guide channel is provided and the reduction gear is disposed between the propellers or rotors, whereby a hollow shaft is no more required.

Figure 20:
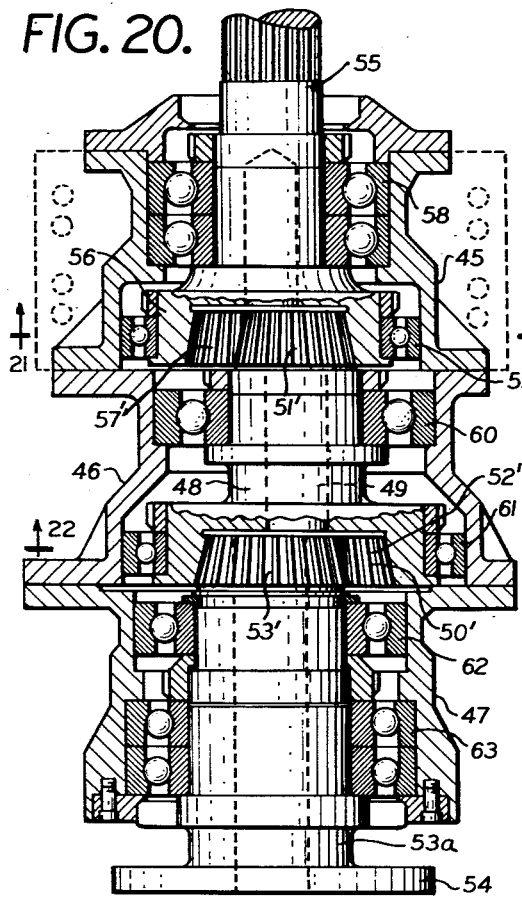
FIG. 20 is an axial section of a reduction gear for rotor units for helicopters similar to the arrangement disclosed in FIG. 14, however, showing bevelled gears.
Figure 21:
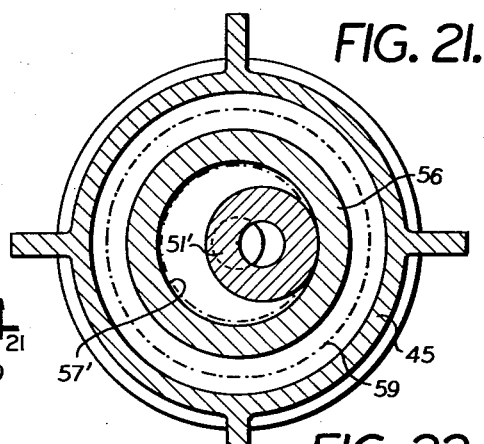
FIG. 21 is a section along the lines 21—21 of FIG. 20.
Figure 22:
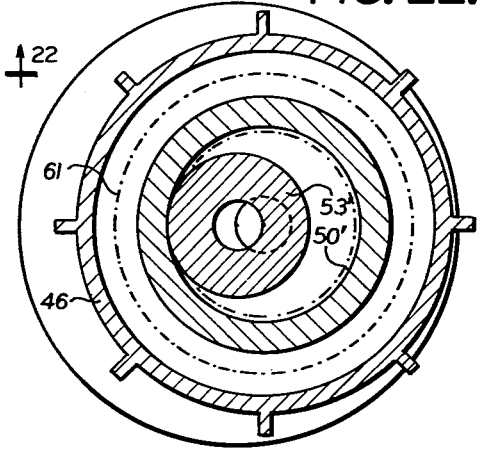
FIG. 22 is a section along the lines 22—22 of FIG. 20.
Figure 23:
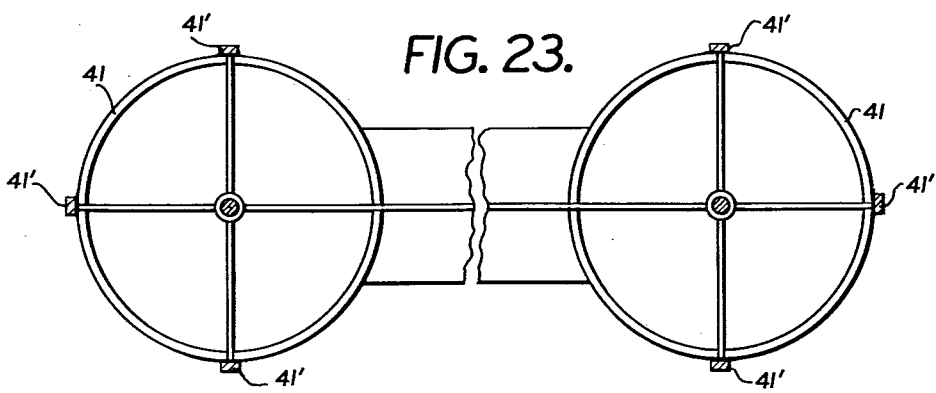
FIG. 23 is a section along the lines 23—23 of FIG. 18.

The fourth possibility resides in a structure whereby three propellers or rotors are disposed in such a manner that the propeller operating the first stage is spaced apart from the propeller operating the second and third stages, the second and third propellers being disposed adjacent each other and a drive, as for instance disclosed in FIGS. 14 or 20, is arranged between the first and second propeller so that the propeller operating the third stage has a rotating speed up to four times of the rotating speed of the propeller operating the first stage. In this case a guide channel is provided at least between the first and second stage propellers.

It is further to be understood that while the present invention has been described in connection with a two-stage propeller unit, it is of course possible to expand the principle of the present invention to three or more stage propeller units.

The fourth design, mentioned above, is particularly suitable for jet blowers in order to create an air stream of high density and high speed for jet drives, combustion chambers or the like of high power.

It is furthermore to be understood that each one of the units described above by example may be used with horizontal axis or vertical axis, or also any inclined axis between the horizontal or vertical positions.

I claim:

1. A propeller unit, consisting of a single drive shaft, two propellers having equal diameter of the blades and disposed in an open space coaxially relative to each other in a series arrangement and means causing rotation of one of said propellers at a greater speed than that of the other of said propellers, a first shaft carrying one of said propellers and a second hollow shaft receiving said first shaft and carrying the other of said propellers, both said propellers turning in the same direction, said single drive shaft being operatively connected with said first and said second shafts, and said propellers being disposed closely towards each other in axial direction.

2. The propeller unit, as set forth in claim 1, wherein said means causing rotation of one of said propellers at a greater speed than that of the other of said propellers is disposed between said propellers.

References Cited in the file of this patent

UNITED STATES PATENTS

| | | |
|---|---|---|
| 1,090,322 | McLaughlin | Mar. 17, 1914 |
| 1,273,827 | Cook | July 30, 1918 |
| 1,637,398 | Syracusa | Aug. 2, 1927 |
| 1,954,437 | Washburne | Apr. 10, 1934 |
| 2,274,743 | Rosskopf | Mar. 3, 1942 |
| 2,437,399 | Morgan | Mar. 9, 1948 |

FOREIGN PATENTS

| | | |
|---|---|---|
| 580,615 | Great Britain | Sept. 13, 1946 |